(12) United States Patent
Telman et al.

(10) Patent No.: US 11,208,909 B2
(45) Date of Patent: Dec. 28, 2021

(54) TURBINE ENGINE AND AIR-BLOWING SEALING METHOD

(71) Applicant: Safran Aircraft Engines, Paris (FR)

(72) Inventors: Cyrille Telman, Moissy-Cramayel (FR); Gaël Frédéric Claude Cyrille Evain, Moissy-Cramayel (FR); Olivier Arnaud Fabien Lambert, Moissy-Cramayel (FR); Mathieu Charles Jean Verdiere, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 16/005,911

(22) Filed: Jun. 12, 2018

(65) Prior Publication Data
US 2018/0355742 A1    Dec. 13, 2018

(30) Foreign Application Priority Data

Jun. 13, 2017    (FR) ...................... 1755263

(51) Int. Cl.
| | | |
|---|---|---|
| *F01D 11/00* | (2006.01) | |
| *F01D 9/00* | (2006.01) | |
| *F01D 25/12* | (2006.01) | |
| *F01D 5/20* | (2006.01) | |
| *F01D 11/12* | (2006.01) | |
| *F02C 9/18* | (2006.01) | |

(Continued)

(52) U.S. Cl.
CPC ............ *F01D 11/006* (2013.01); *F01D 5/187* (2013.01); *F01D 5/20* (2013.01); *F01D 9/00* (2013.01); *F01D 11/04* (2013.01); *F01D 11/122* (2013.01); *F01D 25/12* (2013.01); *F02C 9/18* (2013.01); *F05D 2220/323* (2013.01); *F05D 2220/3213* (2013.01); *F05D 2240/11* (2013.01); *F05D 2240/55* (2013.01)

(58) Field of Classification Search
CPC . F01D 11/06; F01D 9/00; F01D 25/12; F05D 2220/323; F05D 2240/55
See application file for complete search history.

(56) References Cited

U.S. PATENT DOCUMENTS

| | | | | |
|---|---|---|---|---|
| 4,142,824 | A | * | 3/1979 | Andersen .................. F01D 5/20 |
| | | | | 415/115 |
| 4,422,648 | A | * | 12/1983 | Eaton ...................... F01D 11/12 |
| | | | | 277/415 |

(Continued)

FOREIGN PATENT DOCUMENTS

| | | |
|---|---|---|
| EP | 3 112 694 A1 | 1/2017 |
| FR | 3 027 341 A1 | 4/2016 |
| WO | WO 2014/175969 A2 | 10/2014 |

*Primary Examiner* — Igor Kershteyn
*Assistant Examiner* — Joshua R Beebe
(74) *Attorney, Agent, or Firm* — Blank Rome LLP (57) ABSTRACT

A gas turbine engine includes a device for providing sealing between one rotor section and one stator section. The device includes a coating made of an abradable material attached to the stator section. The device further includes a lip on a portion of the rotor section. The lip is configured to form a seal with the abradable material. The gas turbine engine further includes passages for a gaseous fluid and means for blowing such gaseous fluid. The passages open into the rotor section provided with the lip, so that blown gaseous fluid can be present in a zone radially located between the coating and the lip.

15 Claims, 5 Drawing Sheets

(51) Int. Cl.
    *F01D 5/18*        (2006.01)
    *F01D 11/04*     (2006.01)

(56) References Cited

U.S. PATENT DOCUMENTS

| | | | |
|---|---|---|---|
| 4,589,823 A * | 5/1986 | Koffel | F01D 5/20 |
| | | | 415/173.4 |
| 4,820,116 A * | 4/1989 | Hovan | F01D 1/32 |
| | | | 415/115 |
| 5,660,523 A * | 8/1997 | Lee | F01D 5/20 |
| | | | 415/115 |
| 5,733,102 A * | 3/1998 | Lee | F01D 5/187 |
| | | | 415/115 |
| 6,224,336 B1 * | 5/2001 | Kercher | F01D 5/186 |
| | | | 415/115 |
| 6,527,514 B2 * | 3/2003 | Roeloffs | F01D 5/186 |
| | | | 416/97 R |
| 7,632,062 B2 * | 12/2009 | Harvey | F01D 5/20 |
| | | | 415/115 |
| 8,113,779 B1 * | 2/2012 | Liang | F01D 5/20 |
| | | | 416/92 |
| 9,856,739 B2 * | 1/2018 | Bedrosyan | F01D 5/20 |
| 2013/0078084 A1 * | 3/2013 | Gendrich | F01D 5/20 |
| | | | 415/173.1 |
| 2014/0086743 A1 | 3/2014 | Justl et al. | |
| 2015/0078916 A1 * | 3/2015 | Bedrosyan | F01D 5/186 |
| | | | 416/97 R |
| 2016/0186666 A1 | 6/2016 | Suciu et al. | |
| 2016/0222813 A1 * | 8/2016 | Guo | F04D 29/321 |
| 2017/0023023 A1 | 1/2017 | Hiernaux | |

* cited by examiner

TURBINE ENGINE AND AIR-BLOWING SEALING METHOD

This application claims priority to French patent application No. 1755263, filed on Jun. 13, 2017, the contents of which is hereby incorporated by reference.

TECHNICAL FIELD

In a gas turbine engine for an aircraft, such as a turboprop engine or a turbojet engine for an airplane, the present invention relates to the control of sealing as regards the flowing gases.

BACKGROUND

In such a turbine engine, a low-pressure compressor and a high-pressure compressor each driven by a rotating shaft and connected by an intermediate casing delimiting an annular flow channel of a primary air flow circulating globally axially from the low-pressure compressor (BP) toward the high-pressure compressor (HP) are typically provided for.

Such turbine engines conventionally comprise a stationary section (or stator) and a rotating section (or rotor). The considered rotating section is so mounted as to rotate about an axis of rotation, relative to the considered stationary section, with the respectively stationary and rotating sections being locally provided with additional sealing means relative to gaseous fluids which flow in the turbine engine.

In an aircraft turbine or compressor, a rotor section thus specifically comprises turning blades, also called rotating blades, the radially external ends of which are provided with lips. Such lips cooperate with blocks made of an abradable material which define radially internal coatings of a stationary outer wall of the turbine engine on the periphery of which the blocks are attached, as additional sealing means to the lips.

In addition to the free ends of the rotating blades, gas sealing is also provided at radially internal roots of stationary blades which may be provided with the above blocks made of an abradable material, so as to define radially internal sealing means, which complete lips, typically lips of an intermediate sealing ring and/or an intermediate shroud which bears interstage joints and is inserted between axially successive upstream and downstream rotor disks.

These two examples thus refer to sealing provided between respectively stationary and rotating parts via structures comprising a stationary section made of solid material or having a honeycomb structure and lips on the rotating section. This is the case in FR3027341 wherein a labyrinth shroud bears lips which are in contact with abradable tracks of an abradable-holder ring, so as to stop the passage of air at the roots of the stationary blades. The abradable-holder ring is, like the labyrinth shroud, made of 3D woven CMC. This is a constraint, even though controlling the quality of the sealing is always primordial, so that the expected performances of the turbine engine can be reached and the thermal stresses can be limited.

A gas turbine engine is known from U.S. Pat. No. 4,820, 116, which comprises:
  a sealing device provided between a rotor section and a stator section of the turbomachine having a longitudinal axis (X), with the sealing device comprising:
    at least one coating made of an abradable material attached to the stator section,
    at least one lip which is provided on a portion of the rotor section and which is suitable for cooperating with said coating made of an abradable material, for sealing purposes, with the rotor section comprising blades which can rotate about said longitudinal axis (X),
  and the gas turbine engine further comprising:
    through the rotor section, gaseous fluid passages, and means for blowing such gaseous fluid through said passages, which passages open through said portion provided with the lip.

But the zone from which the blown gaseous fluid comes out remains critical. Getting as close as possible to the meeting zones between the leakage air flow and blown air creating such barrier can be desired.

SUMMARY

This is the reason why, and if so required to prevent the above-mentioned disadvantages, a turbine engine as mentioned above is proposed here, which thus comprises a sealing device (or, in a gas turbine engine, a sealing device) between a rotor section and a stator section of the turbine engine,
characterised in that said passages go through at least one lip, so that some gaseous fluid blown therethrough can come out, in a zone radially located between:
  the coating made of an abradable material, and
  the lip.
In the present application:
axial means parallel to the axis of rotation X about which the so-called turning blades of the concerned turbine engine are mounted in rotation,
radial means perpendicular to axis X,
circumferential means extending about the axis X,
external and internal (or outer and inner) respectively mean radially externally and radially internally relative to the axis X; and
lip will also be often translated by: «rubbing strip (seal)» or «labyrinth seal lip».

The above solution should make it possible, at least partly:
  to limit the loss in performance of the engine and the increase in temperature when the radial clearances opposite the lips are open and/or
  to keep, if so desired, the current configurations of the lips, specifically the straight or sloping lips, and/or
  to directly act on the leakage gas flow, by opposing the diffusion thereof, via the expected blowing, and/or
  to favour a delta pressure to the abradable (higher pressure in the radial zone between the (basis of the) lip and the abradable material) and thus create a barrier against the leakage gas, which may cause a sealing loss,
  to avoid any difficulty in precisely controlling the radial clearances opposite the lips, according to the operating conditions of the turbine engine.

As mentioned above, a first practical assembling solution can be found if:
  the stator section comprises nozzle guide vanes provided with outer platforms and inner platforms, with the latter being radially internally connected to roots which said coating(s) made of an abradable material is(are) attached to,
  the rotor section comprises:
    blades which can rotate about said longitudinal axis (X), and an intermediate sealing ring and/or a shroud, having said portion provided with at least one lip and inserted between an upstream disk and a downstream disk of the rotor, which are axially successive, whereon said blades are mounted by the roots thereof, and said passages go through the intermediate sealing ring and/or said shroud.

Said leakage gas barrier will thus be created, without affecting the cooling of the cells, using air drawn from a compressor, which may be used to cool the disk bottoms where the mounting cells of mobile blades on such disks are located.

More generally, the blowing means provided in said passages are so provided as to comprise at least one air feed circuit (hereinafter B) drawn from the compressor of the turbine engine.

As for the origin of the blown air, and although in some turbine engines, it is preferred to use air drawn from the high pressure (HP) upstream compressor to cool parts operating in a hotter environment, and more specifically the HP turbine blade, the bores in the disks, etc . . . , purge could for instance be extracted from a downstream compressor stage, or extracted and mixed from several compressor stages.

As for the gaseous flow which has to be opposed via the barrier flow, it may be provided that, axially between the external and/or internal platforms of the blades of the guide nozzle vanes and those of the (so-called rotating) blades of the rotor section, a leakage gaseous flow (hereinafter the flow V) should be able to travel in slots suitable for such flowing:

outside a gas flowing channel of the turbine engine, in which the blades of the guide nozzle vanes and said blades of the rotor section extend, up to said zones radially located between the lips and the coatings made of abradable material, so that said leakage gaseous flow can meet with the gaseous fluid from said passages.

The passage of said leakage gas, at the lips, from an upstream stage to a downstream stage of the concerned section of the turbine engine will then be prevented, without, in particular, affecting the cooling provided by the leakage gas flow, and thus by jet air.

In another case, a second practical mounting situation can occur, if:

the stator section comprises ring sectors attached (or hooked) on the circumference with an external casing, and which several said abradable coatings are attached to, at least two said lips are positioned at the radially external ends of the blades, and said passages go through at least some of the blades.

In this case, while the air cooling the disk bottoms could be used, said leakage gas barrier will be created, not only without affecting the cooling the disks and the blades roots, but also by cooling, at the same time, the vanes of the mobile blades, which will locally be hollow.

Besides, it is provided that said passages for such blown air go through the at least one lip.

In some cases, having to pierce the lip(s) may be a risk. These are mechanically and thermally sensitive places.

An additional or alternative solution thus provides:

that the turbine engine comprises, radially opposite said at least one coating made of an abradable material, at least two of said lips, and that, toward said zone where the blown gaseous fluid has to come out to create the expected leakage barrier, said passages provided therefor go through, between such at least two lips, said intermediate portion of sealing ring, and/or shroud provided with such lips.

The creation of such passages shall thus be secured, and the shape and position thereof will thus be more precise, and/or the chamber which lies in the space between said at least two, respectively upstream and downstream lips can then be taken advantage of.

An advantageous pressurization of such chamber can be expected.

The first and second practical situations can be combined, or not.

The advantage of improving the shape of the gaseous fluid blowing passages has been mentioned above. In this respect, it may be advantageous to make said passage extend toward said zone while diverging.

As a matter of fact, a widened outlet for the gaseous flux will then be favoured for creating some kind of a barrier gas curtain, which situation will be favored by the rotation of the parts bearing the lip(s). Thus, a sort of dynamic sealing will then be provided.

The same beneficial effect is expected if said passages are so positioned and/or designed that the gaseous fluid flows blown by such adjacent passages overlap, when the turbine engine is operating. As a matter of fact, such provision will favour even more the sealing of the barrier gas curtain thanks to a partial covering of the jets.

It is also recommended, for such favoured effect, that said passages should:

be located axially (axis X) opposite said at least one coating made of an abradable material, and/or be either radial, or so designed as to extend in the upstream direction, towards said coating.

Said technology disclosed above must make it possible, as soon as its principle is being implemented, to obtain engine performances which depend less on the opening of the radial clearances, while keeping the possibility of machining the abradable material when clearance is narrower.

Such technology may apply to all the parts having one or more lip(s) on the low-pressure turbine, i.e. the disks and mobile rings, and also the mobile blades.

Thus, it is a characteristic of the invention that the rotor and stator sections mentioned above belong to a low-pressure turbine of the turbine engine located axially downstream of a high-pressure turbine of the turbine engine.

Besides, it is provided that, if one said blade has a hollow vane, each gaseous fluid passage should be connected therein to another passage in a root of the blade connected to said blowing means.

The gaseous fluid will thus be enabled to efficiently reach the hollow vane, with a centrifuge effect.

BRIEF DESCRIPTION OF THE DRAWINGS

Other advantages and characteristics of the invention will appear upon reading the following description given by way of a non-restrictive example while referring to the appended drawings wherein.

DETAILED DESCRIPTION

Figure 1:
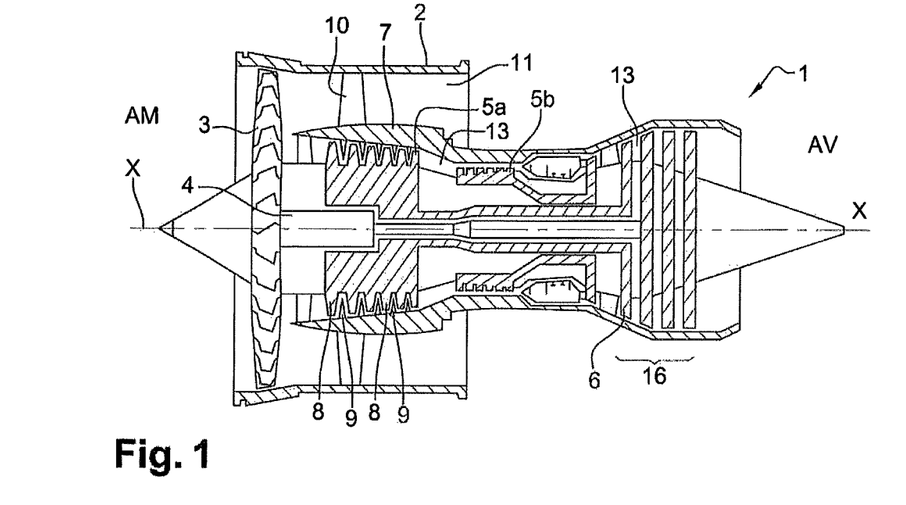
FIG. 1 shows a conventional aircraft turbine machine, in a vertical half-section, along a median plane containing the horizontal axis of X rotation thereof.

As shown in the schema of FIG. 1, dual-flow turbine engine 1 for an aircraft comprises at least one annular outer fan casing 2 inside which various components of the turbine engine are positioned.

At the entrance of the annular outer casing 2, taking account of the air motion direction (which is opposite the aircraft flying direction, i.e. from left to right in the Figure; refer to the arrows), blades of a fan 3 coupled to a rotating shaft 4 are positioned. Various axial compression stages, typically a low-pressure compressor 5a followed by a high-pressure compressor 5b are connected to the shaft 4 which extends about the axis of rotation X of the turbine engine; then various other elements of the engine, among which axial turbine stage(s), typically a high-pressure turbine 6 followed by a low-pressure turbine 16 can be seen.

Air enters the annular outer fan casing 2 from upstream (AM) where it is driven by the fan blades 3. To provide propulsion, the largest part thereof flows in the downstream direction (AV) in the secondary channel 11 radially delimited between a section of the annular outer casing 2 and an engine casing 7 located further inside. Another part of air is sucked into a primary channel 13 by the low-pressure compressor 5a and directed in the downstream direction into the turbine stages by other elements which compose the engine. Besides, stiffening arms 10 connect the annular outer casing 2 and the engine casing 7.

Each compressor, such as the low-pressure compressor 5a, comprises a turning or rotating section, and a stationary section integral with the engine casing 7. More specifically, the compressor comprises an alternation of blades 8 which belong to rotor wheels, coupled with the shaft 4, and thus rotating, and downstream guide vanes 9 (or stators) coupled with the stationary section of the compressor, in order to guide air.

Figure 2:
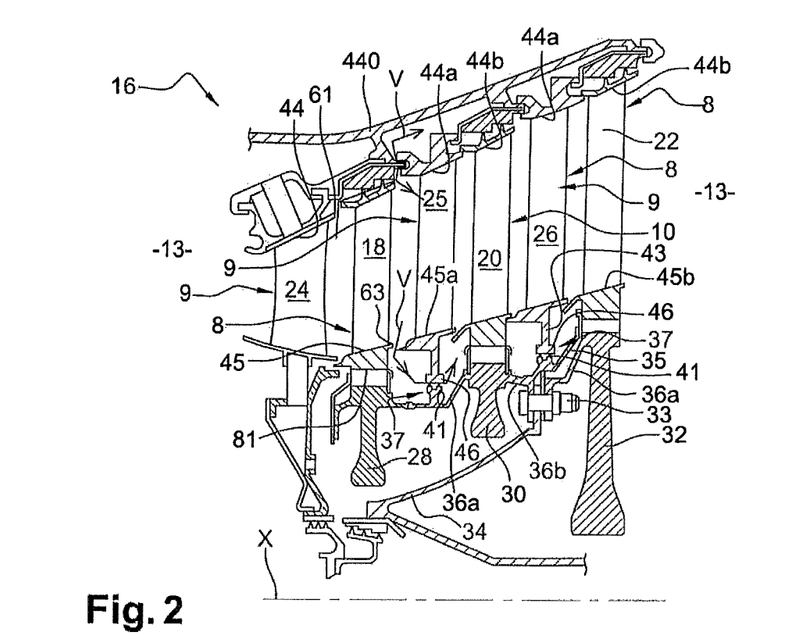
FIG. 2 shows, also in half-section, a section of a low-pressure turbine of the turbine engine of FIG. 1.

In the example, the low-pressure turbine 16 which is partially shown in FIG. 2, comprises rows of rotating or rotor blades 18, 20, 22 (blades 8) and rows of stationary blades 24, 25, 26 (downstream guide vanes 9).

The radially external ends of the stationary blades 24, 25, 26 are mounted by means (not shown) on an outer casing 440 and the radially internal ends of the rotating blades 18, 20, 22 are mounted on rotor disks 28, 30, 32. Each disk comprises an upstream annular shroud 36a and a downstream annular shroud 36b used for attaching disks together and on a driving cone 34 connected to the shaft 4 of the turbine engine, so as to rotate therewith, and for attaching annular flanges holding the blade roots 81 on the disks. The blade roots are so designed as to cooperate with axial grooves provided in the rotor disks. Each rotating blade extends along an axis perpendicular to the axis X of the rotor whereon the blade is mounted.

Two axially successive rotor disks, such as 28,30, are mutually attached to each other via the upstream and downstream annular shrouds mentioned above, by means of bolts 33. An inter-stage joint 37 can be positioned on one of such shrouds 36a,36b or an intermediate sealing ring 35, which can also be held by bolts 33 and positioned on the outer periphery of the corresponding upstream shroud 36a. As a portion of the concerned rotor section, such joint can comprise radial annular extensions or lips 41 which cooperate with an abradable coating 46, so as to define a labyrinth seal.

In general terms, the rotor blades are positioned, and can rotate, about the axis X, between an outer annular limit and an inner annular limit which can substantially respectively be defined by external 44b and internal 45b platforms, respectively, which are provided on the rotating blades and the stationary downstream guide vanes. At least one coating 46 made of an abradable material is attached to each radially internal root 43 of the internal platform 45a of the corresponding stationary or stator blade of the downstream guide vane. The coating 46 can also be provided in sectors and have a honeycomb structure.

Outside, at least one such coating 46 is also indirectly attached to the stationary external casing 440. Fasteners 49a can make it possible to attach the coatings 46 on ring sectors 48 circumferentially bonded to the external casing 440. One section 490 of such Fasteners is positioned radially outside the platforms 44a and adjacent thereto (referring to FIG. 4).

Figure 3:
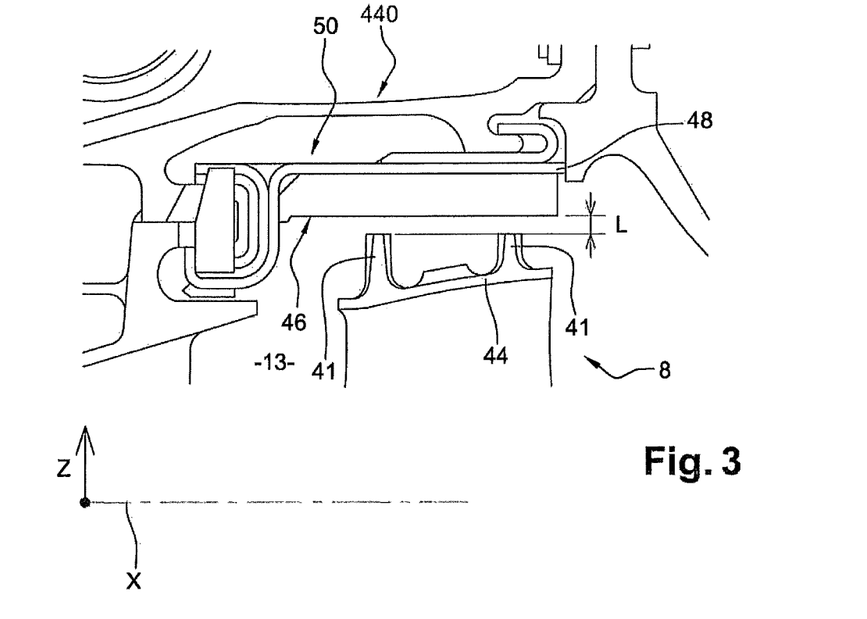
FIG. 3 shows, in vertical section transversally to the axis X, an outer zone showing a section of a movable blade from a turbine stage opposite a sealing sector provided with an abradable material mounted in an outer case, still as prior art.
Figure 4:
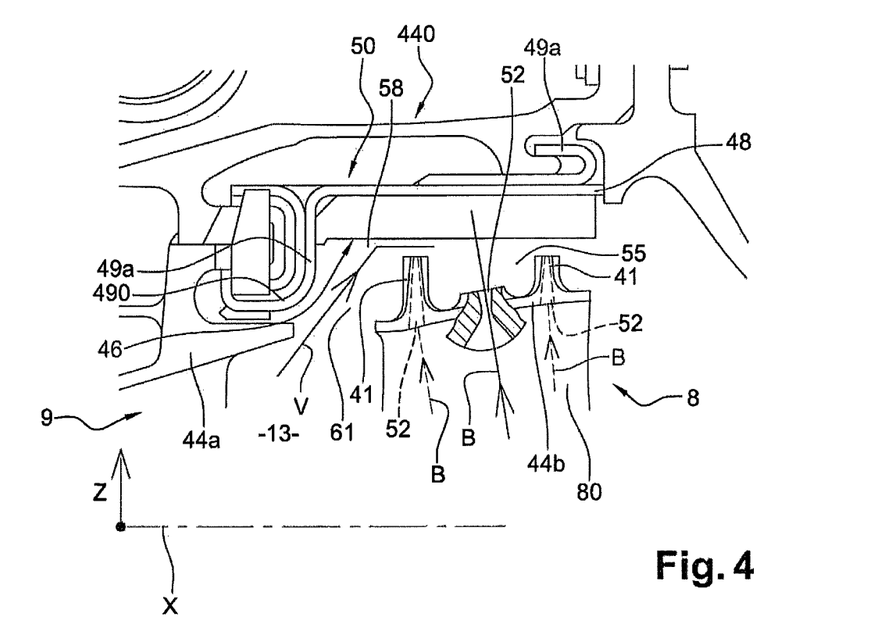
FIG. 4 is the same view as FIG. 3, with a passage for barrier air, according to the invention, through at least one lip (marked with mixed lines), with a complementary possibility of at least one passage for barrier air between two lips, according to another exemplary embodiment of the invention.

As shown in FIGS. 3 and 4, the rotating blades 8 all include lips 41 towards the external platforms 44b, as portions of the concerned rotor section. Such lips 41 frictionally engage with the coating(s) 46 of the stationary outer casing 440 to provide sealing at the top of the concerned rotating blades, i.e. to limit the circulation of parasite air between the rotating blade tips and the coating(s) 46.

Via such a sealing device 50 formed with the coatings 46 associated with the lips 41, when the turbine engine is operated. The stator will then adapt to the shape of the lips which rub thereon at their tips, by abrasion.

Now, as explained above, sealing depends on the radial distance (L, FIG. 3) between the stationary section, here the coatings 46, and the rotating section, here the lips 40.

It should be noted that the various coating(s) 46 and lip(s) 40/41 could be, among others, a radially staged coating and/or one or more inclined lip(s).

One aim of the invention is thus:
  to limit the importance of having to precisely control such a distance, and/or
  to provide a solution which completes the current sealing control.

This is the reason why the following elements, as shown in FIGS. 4-7 and 9, are provided on the turbine engine:
  through the considered rotor section 8, 35, 36a, 36b, 37, gaseous fluid passages 52, and
  means 54 for blowing such gaseous fluid into said passages 52.

The passages 52 open:
through the considered lip(s) 41, and possibly further, in the vicinity of such lip(s) 41, through the considered rotor portion such as 35a, 36 and/or 35 and/or 44b.

In that way, blown gaseous fluid B will then be able to come out in a zone 55 radially located between:

the coating 46 made of an abradable material, and
the considered lip(s) 41.

The section of the turbine engine will advantageously be the low-pressure turbine 16.

The means 54 blowing, in the passages 52, gaseous fluid (flux B; in FIGS. 4-8) thus provided to stop the leakages V of channel air, as also shown in FIG. 2, can come from the HP compressor 5b, via air drawing or feeding circuits 56 (refer to FIG. 9), as already used for cooling the disks, such as 28, 30, 32 (the circuits shown 56, which may be circuits of the «LTP cooling» and/or «Bore cooling» types are actually located inside the turbine engine). Air is thus fed here to pressurize the above-mentioned zone 55, where said barrier air is provided.

To have barrier air B flow in the expected direction (to the considered zone 55), the flow rate of air supplied, in the example, by the circuits 56 will have to be adjusted so as to have a higher pressure in the zone 55 than in the environment thereof, as upstream thereof; referring to the spaces 58 in FIGS. 4-7.

As (at least a part of) the air B drawing or feeding circuits 56, it can also be provided to use one or more tube(s) supplying low temperature cooling air flow(s) (so-called LTCA tubes) which, as is known, often supply relatively cool air to a section of the turbine 16 from a section of the compressor 5b (referring to WO2014175969).

Figure 5:
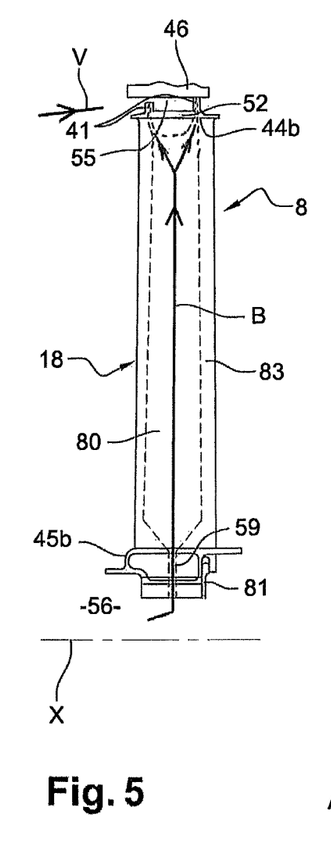
FIG. 5 is a side view of a mobile blade, here a hollow one, also provided with such a passage through the lip.

The zones located at the outer periphery of the rotor blades 8 will typically be among those concerned by such air blowing, as shown in FIGS. 4-5.

The situation, in this case, is as follows:
the concerned stator section comprises the ring sectors 48 which several so-called abradable coatings are attached to,
and the rotor section comprises the blades 8 said portion 44b (platform) of which is provided with several said lips 41, at the radially external end thereof.

To facilitate access of barrier air to the zone 55, the passages 52 can then go through at least some of the blades 8. The blades will then be, at least locally, hollow; the portion 80 in FIG. 4 or 5, with another passage 59 in the root 81 and the inner platform of the blades, makes it possible for the air supplied by the air feed circuit 56 to reach the hollow vane 83. Then, in one said blade having such a hollow vane, each gaseous fluid passage 52 will advantageously be connected to another passage 59 located in the root 81 and connected, via the circuit 56, to the above-mentioned blowing means 54. Said gaseous fluid will thus be enabled to easily reach the hollow vane 83.

Figure 6:
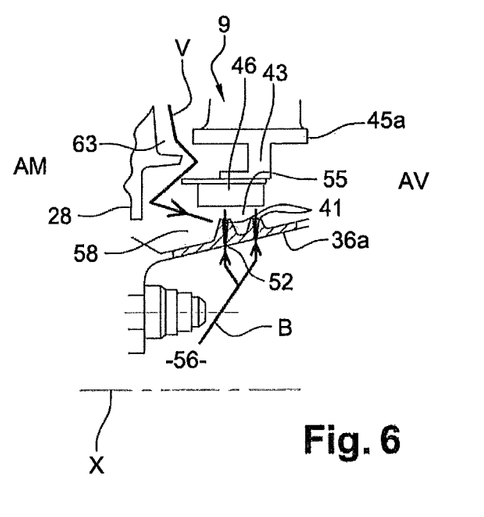
FIGS. 6 and 7 show two alternative embodiments of the invention, still in a transversal vertical section, when the passages are provided on disk shrouds or mobile ring shrouds.
Figure 7:
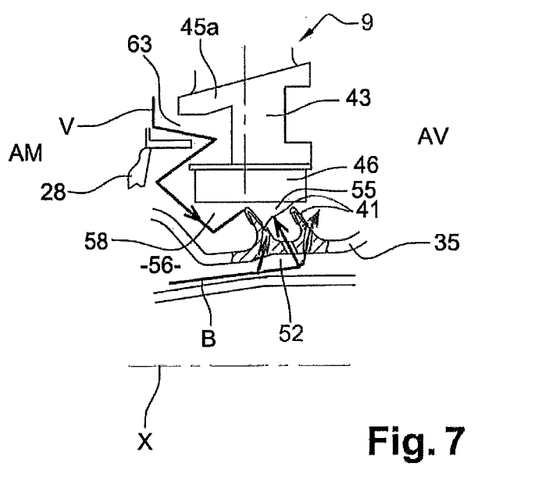
Figure 8:
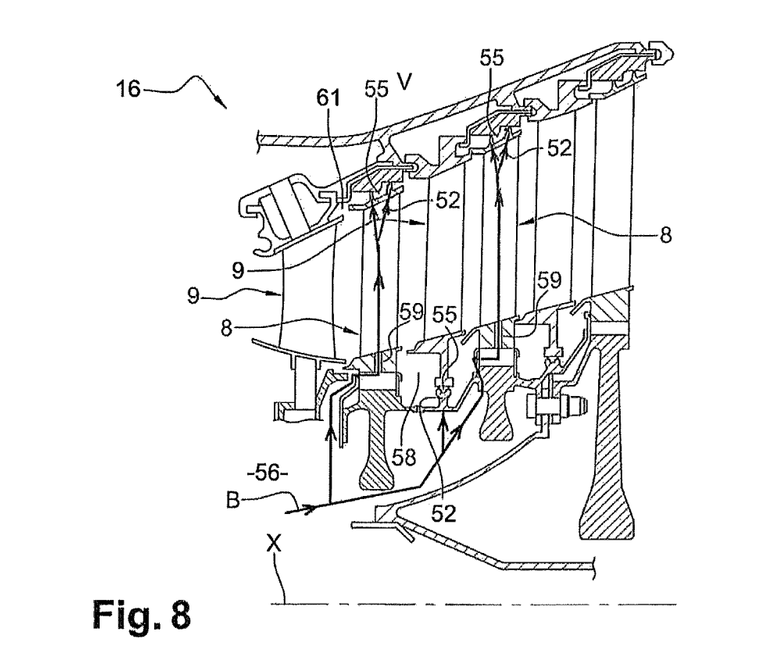
FIG. 8 shows, along the same cut, an exemplary barrier fluid circuit in the schematized turbine.
Figure 9:
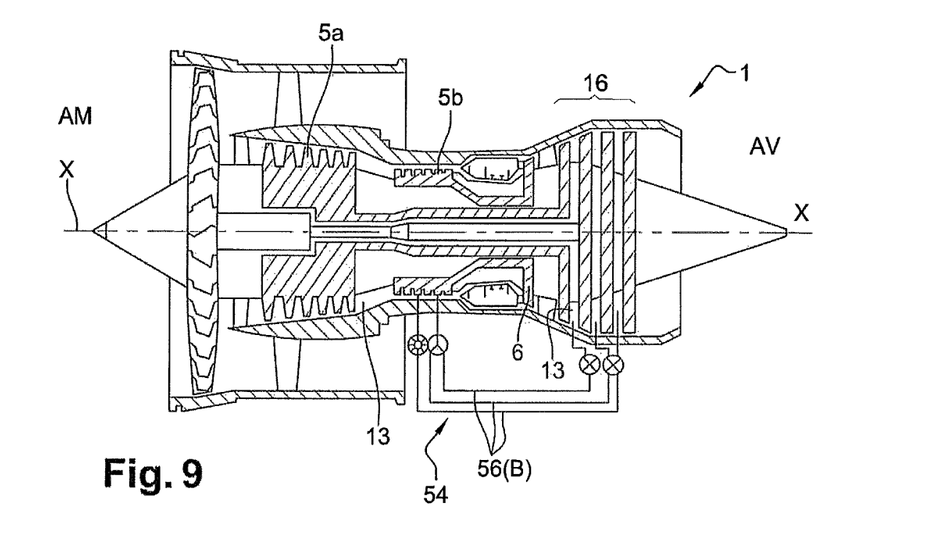
FIG. 9 is similar to FIG. 1 and shows an exemplary air drawing and feed system enabling to use such air as barrier air.

Other zones are concerned by such air blowing: those located at the internal periphery of the stator blades, as shown in FIGS. 6-7.

The situation, in this case, is as follows:
the stator section comprises nozzle guide vanes 9, at the inner roots 43 of which several said coatings 46 made of abradable material are attached,
and the rotor section comprises:
said blades 8 mounted in rotation about the axis X, and several said lips 41 provided on the intermediate ring 35 and/or on one of the disk shrouds 36a, 36b, inserted between said axially successive upstream and downstream disks, such as 28, 30, whereon said blades 8 are mounted by the roots thereof, and a portion of which is thus provided with such lips 41.

The passages 52 thus go through the intermediate sealing ring 35 (FIG. 7) and/or said at least one disk shroud 36a, 36b (FIG. 6).

As can be seen in FIGS. 4-7, axially between at least some of the external 44a and internal 45a platforms of the guide vanes 9 of the nozzle guide vane and those 44b, 45b of the rotor blades 8, the leakage gaseous flow V occurs via one or more slot(s) 61 and/or 63 designed for enabling such flow V:
out of the channel 13 of the turbine engine wherein the nozzle guide vanes and the rotor blades 9, 8 extend, towards space 58 axially positioned:
between the considered upstream (AM) disk, such as 28 in FIGS. 6-7, and the inner roots 43 of the downstream guide vanes 9 positioned downstream, and/or
between a section of the fasteners 49a of the coatings 46 (section 490) and the external platforms 44b with their lips (FIG. 4).

As the zones 58 and 55 communicate, a gas leakage will then reach said ones 55 located opposite the guide vanes 9, so that said gaseous leakage V meets the barrier gaseous fluid B from the passages 52 and the progression thereof is stopped. The leakage flow is then stopped.

To provide the through passages 52, these can be provided through the lip(s) 41, as shown in FIGS. 3 and 6. A double barrier will then oppose the leakage flow through two upstream and downstream lips. But lips are brittle structures and are exposed to high stress.

Another solution may then be preferred:
at least two annular lips 41 can be provided radially opposite said coating 46 made of abradable material, as shown in FIGS. 4, 6 and 7, and
the passages 52 can go, towards said zone 55 and at least at the positions of the at least two lips, through:
the intermediate sealing ring 35 and/or said at least one shroud 36a, 36b (FIG. 7),
and/or the concerned external platform 44b (FIG. 4, in dotted lines).

Figure 10:
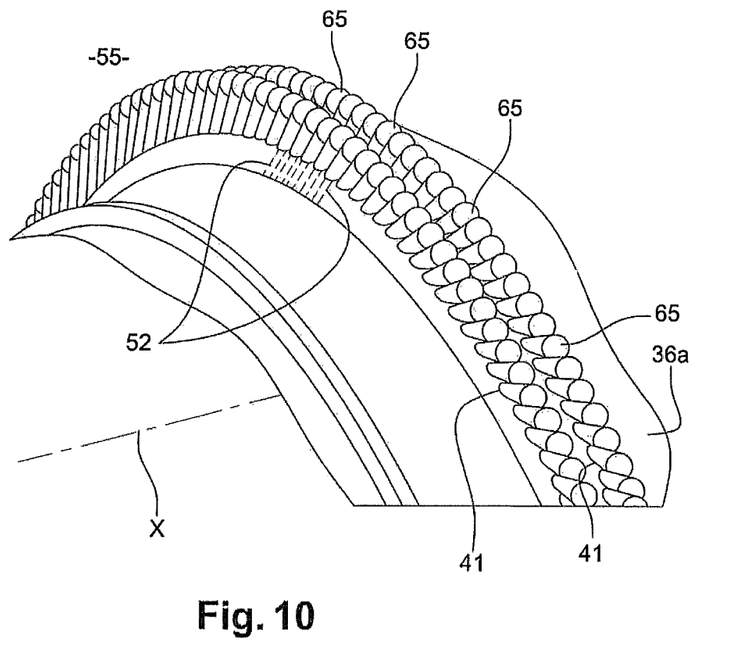
FIG. 10 shows the barrier air coming out of a series of above-mentioned passages.

To optimize the solution disclosed here, it will be tried to rather easily provide the passages 52 typically obtained by piercing and to have the jets 65 of fluid B, which come out of said adjacent passages overlap in operation, i.e. when the turbine engine 1 is operated, and thus specifically that the rotor blades 8 rotate about the axis X. FIG. 10 shows such dynamic sealing. This solution advantageously has fewer manufacturing constraints.

Another solution with the same advantages, and which may complete the previous one, provides that said passages 52 extend towards the zone 55 while diverging. It can be frustoconical holes. This is shown in FIG. 6 and may be assumed in FIG. 10, considering the frustoconical shape of the jets 65. In another case, as shown in FIG. 5 or 7, the holes for the passages 52 are cylindrical with a constant circular section.

In the concerned structural portion, the passages 52 will typically be formed on the circumference, about the axis X, along a row (FIGS. 4, 5, 7) or two axially adjacent rows (FIG. 6).

These are radial (Axis Z) but could also follow the orientation of the lips (refer to the lips inclined in the upward direction, in FIG. 7). It can thus be preferred for the holes, or passages 52, which have to be opposite to the considered abradable coating 46, to be provided in the direction opposite the travel of hot air, in order to extend in the upstream direction, as shown in FIG. 7, and to blow the flow B in the upstream direction.

As can be deduced from the above, and as shown in the Figures, at least one passage 52 through a lip 41 and at least one passage 52 can be separated or associated, at will, opposite zone 55:

through a platform 44b,
and/or through an intermediate sealing ring 35 or a shroud 36a.

What is claimed is:

1. A gas turbine engine having a longitudinal axis, an upstream side and a downstream side along said longitudinal axis, and comprising:
   a gas vein in which gas is allowed to pass,
   a rotor section comprising a plurality of blades configured to rotate about said longitudinal axis in the gas vein,
   a stator section comprising a plurality of guide vanes extending in the gas vein to guide gas in the stator section,
   a sealing device providing sealing between the rotor section and the stator section, said sealing device comprising a plurality of couples of coating elements and lip elements, with:
      each coating element comprising an abradable material and being attached to the stator section; and
      each lip element being provided on a portion of the rotor section and suitable for cooperating with one of said coatings, for sealing purposes,
   passages through the rotor section, each passage opening in a space between one of said coating element and one of said lip element, each passage having a top and a bottom,
   blowing means for blowing a gaseous fluid to a circuit for providing said gaseous fluid to said passages from bottom to top, up to said spaces,
   wherein the top of the passage extends from the bottom of the passage in an upstream direction oriented towards the abradable material, and wherein at least some of the passages pass through at least some of the lip elements, and wherein each lip element comprises two lips that both extend in the upstream direction,
   wherein at least some of the passages through the rotor section pass through at least some of said plurality of blades, and
   wherein:
      a respective one of the lip elements is positioned at the radially external end of each of the plurality of blades, and
      at least some of said passages passing through at least some of said plurality of blades extend through the lips of the lip element positioned at the top of each blade toward the respective inner space while diverging.

2. The gas turbine engine according to claim 1, wherein: the rotor section comprises:
   an upstream disk and a downstream disk which are axially successive and whereon said blades are mounted by roots thereof, and
   at least one of:
      an intermediate sealing ring, and
      at least one shroud provided with said at least one lip and disposed between the upstream disk and the downstream disk, said at least one shroud longitudinally extending between the upstream disk and the downstream disk for mechanically connecting said upstream disk and the downstream disk together;
   the guide vanes are provided with inner platforms radially internally connected to roots which said at least one coating is attached to; and
   the passages pass through said at least one of the intermediate sealing ring and the at least one shroud.

3. The gas turbine engine according to claim 1, wherein:
   the stator section comprises ring sectors which several said abradable coatings are attached to,
   at least some of the lip elements are positioned at the radially external ends of the blades, and
   said passages go through at least some of the blades.

4. The gas turbine engine according to claim 1, wherein the blowing means comprise at least one air feed circuit drawn from a compressor of the turbine engine.

5. The gas turbine engine according to claim 1, wherein said passages are so positioned and/or conformed that flows of gaseous fluid blown through adjacent passages overlap when the turbine engine is operated.

6. The gas turbine engine according to claim 1, wherein said rotor and stator sections belong to a low-pressure turbine of the turbine engine located axially downstream of a high-pressure turbine of the turbine engine.

7. The gas turbine engine according to claim 1, wherein each coating element comprise successive coating members disposed circumferentially around said longitudinal axis, and individually located, radially to said longitudinal axis, in front both at least one of the lip element and at least one of the passage, when the gas turbine engine is off, so that the blades do not rotate.

8. The gas turbine engine according to claim 7, wherein at least some of the couples of coating elements and lip elements individually comprise at least two lips which are, radially to the longitudinal axis, opposite the coating element of the couple of coating elements and lip elements.

9. The gas turbine engine according to claim 8, wherein at least some of the passages passing through at least some of said plurality of blades individually open in the space located, radially to said longitudinal axis, in front of the coating element of one of said couples of coating elements and lip elements.

10. The gas turbine engine according to claim 1, wherein each of the lips are, radially to the longitudinal axis, opposite the respective coating element of the respective couple of coating elements and lip elements.

11. The gas turbine engine according to claim 1, wherein each lip has an upstream side and a downstream side that are each inclined in the upstream direction.

12. A gas turbine engine having a longitudinal axis, an upstream side and a downstream side along said longitudinal axis, and comprising:
   a gas vein in which gas is allowed to pass,
   a rotor section comprising a plurality of blades configured to rotate about said longitudinal axis in the gas vein,
   a stator section comprising a plurality of guide vanes extending in the gas vein to guide gas in the stator section,
   a sealing device providing sealing between the rotor section and the stator section, said sealing device comprising a plurality of couples of coating elements and lip elements, with:
      each coating element comprising an abradable material and attached to the stator section; and
      each lip element being provided on a portion of the rotor section and suitable for cooperating with one of said coatings, for sealing purposes, each lip element comprising two lips, each lip having an outer side and an inner side such that inner sides of each of said two lips define therebetween, parallel to said longitudinal axis, an inner space, and each lip extending in the upstream direction, passages through the rotor section, each passage having a top and a bottom and opening in said respective inner space between one of said coating elements and one of said lip elements, blowing means for blowing a gaseous fluid to a circuit for providing said gaseous fluid to said passages from bottom to top, up to said inner spaces, wherein the top of the passage extends from the bottom of the passage in an upstream direction oriented towards the abradable material, and wherein at least some of the passages pass through at least some of the lip elements, wherein at least some of the passages through the rotor section pass through at least some of said plurality of blades, and wherein:
- a respective one of the lip elements is positioned at the radially external end of each of the plurality of blades, and
- at least some of said passages passing through at least some of said plurality of blades extend through the lips of the lip element positioned at the top of each blade toward the respective inner space while diverging.

13. The gas turbine engine according to claim 12, wherein said at least some of the passages are so positioned and/or conformed that flows of gaseous fluid blown through adjacent passages overlap when the gas turbine engine is operated.

14. The gas turbine engine according to claim 12, wherein at least some of the passages passing through at least some of said plurality of blades individually open in the space located, radially to said longitudinal axis, in front of the coating element of one of said couples of coating elements and lip elements.

15. The gas turbine engine according to claim 12, wherein the inner side and outer side of each lip are inclined in the upstream direction.

* * * * *